Patented July 6, 1937

2,086,507

UNITED STATES PATENT OFFICE 2,086,507

PREPARATION OF HYDROCYANIC ACID

Alfred T. Larson, Wilmington, Del., assignor to E. I. du Pont de Nemours & Company, Wilmington, Del., a corporation of Delaware No Drawing. Application July 13, 1935
Serial No. 31,285

6 Claims. (Cl. 23—151)

This invention relates to an improved process for the manufacture of hydrocyanic acid by the catalytic dehydration of formamide and more particularly to a new catalyst for that synthesis.

It is known that when formamide vapor, alone or together with other gases, is passed over certain catalysts it decomposes in accordance with the equation:

$$HCONH_2 = HCN + H_2O$$

Among the catalysts which it has been proposed to use are alloys containing copper, zeolites, hygroscopic inorganic salts, thoria and alumina. While it is true that many of these catalysts give a fair yield of hydrocyanic acid, when considered merely on a percentage basis, such a yield is not sufficient to render the process commercial. The principal reason why the catalysts heretofore proposed have not raised the process to a commercial status is, that formamide readily decomposes to carbon monoxide and ammonia and to tarry polymerized products. This decomposition occurs during vaporization, and dehydration. Moreover, any unconverted formamide in the crude product is most difficult to recover and consequently a process which gives only a fair yield of hydrocyanic acid, leaving, for example, 10% or more of unconverted formamide, is of no great value from the commercial standpoint since, by any practical process, only a very small portion of the unconverted formamide can be recovered for subsequent working.

An object of the present invention is to provide an improved process for the dehydration of formamide to hydrocyanic acid. Another object of the invention is to provide a process for the dehydration of formamide in which many of the difficulties inherent in former processes are eliminated. A still further object of the invention is to provide a new catalyst for the dehydration of formamide to hydrocyanic acid which gives such a high yield of the hydrocyanic acid that the relatively insignificant amount of unconverted formamide present in the crude product need not be recovered. Other objects and advantages of the invention will hereinafter appear.

The objects of the present invention are attained by employing a solid manganese oxide such as natural pyrolusite and preferably fused or sintered manganese oxide as a catalyst for the decomposition of formamide to hydrocyanic acid and water. The catalyst should be employed in the solid form in contradistinction to the pulverulent or finely divided form. Natural pyrolusite is generally obtained in this form and is quite suitable. I find that other forms of manganese oxides can be converted to the desirable solid form by fusion. For example, the organic salts of manganese such as manganese acetate, oxalate and the like, may be fused in an oxyhydrogen flame; flocculent manganese oxide may also be fused in the same manner, the fusion is cooled, crushed and the particles screened to the desired size. The catalysts may be employed on any suitable support such as kieselguhr, silica gel, and the like, or may be used unsupported, if desired.

The process is preferably conducted by first vaporizing the formamide by contacting it with a suitable vaporization surface, maintained at a temperature above the boiling point of formamide under the pressure used, such as is disclosed in Lacey U. S. Patent 1,934,433, and the Carlisle U. S. Patent 1,934,485. This step of the process should be conducted in such a manner that there is substantially no decomposition of the formamide to tarry polymerized products or to ammonia and carbon monoxide. The vaporized gas is then passed into direct contact with the manganese oxide catalyst whereupon substantially all of the formamide is converted to hydrocyanic acid and water.

The invention will be illustrated by means of examples but it will be understood that it is not limited by the details therein given.

*Example 1.*—Formamide was vaporized at atmospheric pressure by allowing the liquid to fall dropwise on a heated surface of particles of silica, care being taken that each drop was fully vaporized before the next fell, the resulting vapors were then passed at a space velocity of 1000 (which is the ratio of the volume of vaporized formamide calculated under standard conditions of temperature and pressure flowing per hour over a unit volume of the catalyst), into a copper lined pressure sustaining conversion chamber, which had been charged with a fused manganese oxide catalyst and, in which, the temperature was maintained in the neighborhood of 600° C. The catalyst may be prepared by fusing pyrolusite in an oxyhydrogen flame and the fused mass on cooling, may be crushed and screened to an 8–14 mesh size. Under these conditions a 93% yield of hydrocyanic acid, calculated on the formamide used, was obtained.

*Example 2.*—The procedure described in the above example was repeated with a catalyst prepared by fusing manganese oxalate in an oxyhydrogen flame, the fusion product being crushed and screened to a suitable size prior to use; a space velocity per hour of 750, and a temperature of 550° C., was employed. A yield of 96% was obtained.

When utilizing the catalysts of this invention temperatures ranging between 400 and 700° C., may be employed; but a temperature of 550° C., is preferred. While, generally speaking, very satisfactory results are obtained when the process is conducted at a pressure in the neighborhood of atmospheric pressure, reduced or elevated pressures may be employed if desired.

From a consideration of the above specification it will be realized that many changes may be made in the details therein given without departing from the invention or sacrificing any of its advantages.

I claim:

1. In a process of synthesizing hydrocyanic acid by the catalytic dehydration of formamide the step which comprises conducting the reaction in the presence of fused manganese oxide as the catalyst at a temperature between approximately 400° and 700° C.

2. In a process of synthesizing hydrocyanic acid by the catalytic dehydration of formamide the steps which comprise vaporizing formamide by heating it rapidly in the presence of a suitable vaporization surface to a temperature above its boiling point and directly thereafter subjecting the vaporized formamide to the dehydrating action of a fused manganese oxide catalyst at a temperature between approximately 400° and 700° C.

3. In a process of synthesizing hydrocyanic acid by the catalytic dehydration of formamide the step which comprises vaporizing formamide and passing the resulting vapors over a fused manganese oxide catalyst at a temperature ranging between 400° and 700° C.

4. A process for the preparation of hydrocyanic acid by the catalytic dehydration of formamide which comprises vaporizing formamide from a vaporization surface maintained at a temperature above the boiling point of formamide, and subsequently passing the resulting vapors into a catalyst bed comprising fused manganese oxide wherein the dehydration of the formamide to hydrocyanic acid is conducted at a temperature of approximately 550° C.

5. A process for the preparation of hydrocyanic acid which comprises vaporizing formamide from a vaporization surface, heated above the boiling point of the formamide under the pressure used, and thereafter passing the resulting vapors into a fused manganese oxide catalyst, wherein the dehydration of the formamide to hydrocyanic acid is conducted at a temperature of 550° C., the catalyst being prepared by fusing pyrolusite, crushing the cooled fusion and screening to size.

6. In a process of synthesizing hydrocyanic acid by the catalytic dehydration of formamide the step which comprises conducting the reaction at a temperature between approximately 400° and 700° C., in the presence of a fused manganese oxide catalyst which has been prepared by fusing an organic salt of manganese in an oxyhydrogen flame and subsequently cooling, crushing and screening the particles to the desired size prior to use.

ALFRED T. LARSON.